United States Patent [19]

Royce

[11] 3,899,191
[45] Aug. 12, 1975

[54] VEHICLE-MOUNTED SEAT BELT ASSEMBLY

[76] Inventor: Robert E. Royce, 4345 S. Santa Fe Dr., Englewood, Colo. 80110

[22] Filed: Nov. 30, 1972

[21] Appl. No.: 310,895

[52] U.S. Cl. .............................. 280/150 SB; 297/389
[51] Int. Cl. ............................................. B60r 21/02
[58] Field of Search......... 280/150 SB, 150 B, 65 R; 297/388, 389, 396, 349; 80/82

[56] References Cited
UNITED STATES PATENTS

| | | | |
|---|---|---|---|
| 2,777,531 | 1/1957 | Erickson | 280/150 SB |
| 3,191,400 | 6/1965 | Swenson | 297/349 |
| 3,220,747 | 11/1965 | Marion | 280/150 SB |
| 3,411,602 | 11/1968 | Royce | 280/150 SB |
| 3,684,310 | 8/1972 | Weststrate | 280/150 SB |
| 3,754,775 | 8/1973 | Williams | 280/150 SB |

FOREIGN PATENTS OR APPLICATIONS

| | | | |
|---|---|---|---|
| 225,370 | 3/1968 | Sweden | 297/396 |

Primary Examiner—Robert R. Song
Attorney, Agent, or Firm—Burton, Crandell & Polumbus

[57] ABSTRACT

A passenger safety arrangement including a vehicle-mounted, passive seat belt assembly is disclosed herein and includes a vehicle seat, preferably of the cacoon type, having a generally horizontally disposed seat portion, a backrest, and an inboard armrest or seat belt positioning means disposed adjacent one side of the seat portion. The assembly may also include an inboard portion for restraining inward movement of the head of a person seated in the vehicle seat. A part of the seat belt positioning means lies in a horizontal plane in which is disposed the upper surfaces of the legs of a person when seated in the vehicle seat. The assembly also includes a seat belt arrangement which is designed to automatically fit around a person who moves into the vehicle seat. The arrangement includes a seat belt movement control mechanism which is mounted to the vehicle door and a seat belt having one end portion disposed in contacting engagement with the aforestated part of said seat belt positioning means, a second end portion connected with the seat belt control mechanism and a third or waist securing portion extending between the first and second end portions and disposed uninterrupted in extent above the seat portion for any open or closed position of the vehicle door. An additional shoulder securing seat belt portion extends from the aforestated third or waist securing seat belt portion and is suitably held in a forwardly spaced position with respect to the backrest of the vehicle seat for any opened or closed position of the vehicle door. The shoulder securing seat belt portion has one or more surface portions which, in cross-section, are generally circular in configuration and constructed for rotation relative to a portion of said shoulder securing seat belt. By designing the seat belt arrangement in the foregoing manner, a person entering into the vehicle and into the seat automatically moves between the back rest and the waist and shoulder securing seat belt portions. Upon closing the vehicle door, the seat belt is retracted for maintaining a predetermined tautness therealong. The passenger safety arrangement also includes an inflatable assembly for increasing safety to the passenger.

18 Claims, 11 Drawing Figures

PATENTED AUG 12 1975　　SHEET　2　　3,899,191

VEHICLE-MOUNTED SEAT BELT ASSEMBLY

BACKGROUND OF THE INVENTION

1. Field of the Invention

The present invention is directed generally to safety arrangements for persons riding in vehicles and more particularly to a seat belt assembly which automatically secures a person to a vehicle seat upon his occupying the latter and a bladder arrangement for providing further safety.

2. Discussion of the Prior Art

Prior art safety belt apparatus have proven their worth in the use of decreasing injury to the passengers of vehicles. However, previous safety belt apparatus have been found not to be completely satisfactory. One reason for this is that they do not automatically secure a passenger to the vehicle seat upon entry by the passenger into the vehicle. This disadvantage has been greatly diminished by an automatic safety belt apparatus disclosed in U.S. Pat. No. 3,411,602 issued to Robert E. Royce, applicant of the present invention.

The Royce patent is directed to a safety belt apparatus for a vehicle and includes a belt arrangement adapted to automatically fit around a person seated within the vehicle. As will be seen hereinafter, the present invention is an advancement over the invention of the above-mentioned Royce patent.

OBJECTS OF THE INVENTION

One object of the present invention is to provide a new and improved seat belt assembly which automatically secures a person to a vehicle seat.

Another object of the present invention is to provide a new and improved seat belt assembly which greatly decreases the chance of a passenger being injured while riding in a vehicle.

Another object of the present invention is to provide a new and improved seat belt assembly which is automatic in operation and which continuously maintains predetermined portions of the seat belt in predetermined positions across the vehicle's seat for any position of the vehicle door.

Another object of the present invention is to provide a seat belt assembly of the last-mentioned type wherein a portion of the seat belt is adapted to fit around a person's waist and a portion is adapted to fit around a person's shoulder when the person is seated within a vehicle.

Another object of the present invention is to provide an assembly of the last-mentioned type wherein the shoulder securing portion of said seat belt has one or more surface portions which, in cross-section, are generally circular in configuration and constructed for rotation.

Another object of the present invention is to provide a new and improved seat belt arrangement which minimizes the possibility of injury to the shoulder and/or neck area of a passenger through the use of a novel shoulder securing seat belt.

Another object of the present invention is to provide an assembly of the last-mentioned type in combination with an inflatable bladder or cushion means disposed in front of said vehicle seat, means for inflating said bladder proportionate to and in response to increases in speed of the vehicle, and means for deflating said bladder proportionate to and in response to decreases in speed of said vehicle.

Another object of the present invention is to provide a novel passenger safety assembly including a seat belt assembly of the last mentioned type and an inflatable bladder assembly for cushioning the passenger in the event the passenger is thrown toward the front of the vehicle.

Another object of the present invention is to provide an assembly of the last-mentioned type wherein the seat belt is positioned such that the person, upon entering into the vehicle, moves between the aforestated seat belt portions and seat, whereupon closing the vehicle door secures the seat belt portions in place.

Another object of the present invention is to provide an assembly of the last-mentioned type wherein the seat belt is adjustable for fitting the contour of the person within the vehicle.

Another object of the present invention is to provide a new and improved safety seat arrangement including a cacoon-type seat.

These objects and other objects of the present invention will become apparent from the following descriptions.

DETAILED DESCRIPTION

Figure 1:
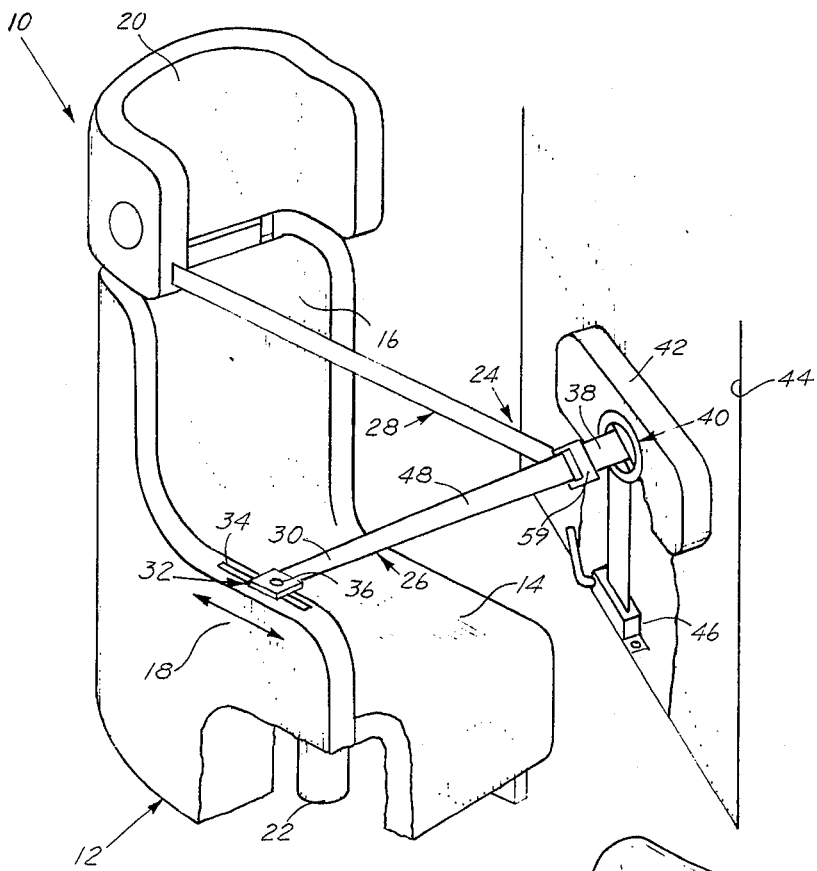
FIG. 1 is a partially broken away perspective view of a preferred seat belt assembly constructed in accordance with the present invention.

The present invention is directed to a new and novel assembly for automatically and safely securing a person in the seat of a vehicle with practically no inconvenience to the person. In fact, once the assembly is adjusted in accordance with the size of the person intending to use the assembly, that person may thereafter enter the vehicle at any time and will automatically be safely secured to the seat, once the vehicle door is closed.

In order to achieve the foregoing, the seat belt assembly, in accordance with the instant invention, includes a seat belt having one end portion disposed in contacting engagement with a seat belt positioning means preferably located on an inboard armrest comprising part of the vehicle's seat. The other end portion of the seat belt is disposed in contacting engagement with another seat belt positioning means preferably located on an outboard armrest comprising part of the adjacent vehicle door and fastened to a movement control mechanism mounted to the vehicle door. As will be seen hereinafter, the intermediate portion of the seat belt is maintained at all times in a generally horizontal plane just above the legs of a person when he is seated within the seat. Such arrangement minimizes or eliminates binding of a person's clothing by said seat belt or the clothes from "riding" up the legs of such person.

Operationally, as the door to the vehicle is opened, an end portion of the seat belt unwinds from the movement control mechanism. However, the intermediate portion of the seat belt is maintained in the aforestated horizontal plane. In this manner, the person can move into the vehicle's seat through the open door so that the horizontally extending seat belt portion is directly in front of him and over his legs. Upon closing the vehicle door, the unwound end portions of the belt automatically rewinds back on the control mechanism for maintaining a predetermined tautness to the seat belt.

The foregoing features of the present invention, as well as other features thereof, will become apparent from the following description of the drawings, wherein like components are designated by like reference numerals throughout the various figures.

Turning now to the drawings, attention is directed to FIG. 1 which illustrates a vehicle-mounted safety seat assembly 10 constructed in accordance with one embodiment of the present invention. The assembly includes a vehicle seat 12, preferably of the cacoon type, having a generally horizontally disposed seat portion 14, a generally vertically disposed backrest portion 16 and an inboard armrest portion 18 disposed adjacent seat portion 14 and extending upwardly therefrom. In addition, the seat may include a generally U-shaped head rest 20 including conventional means 21 (FIG. 5) mounting the head rest for vertical movement to the top of backrest portion 16.

Figure 5:
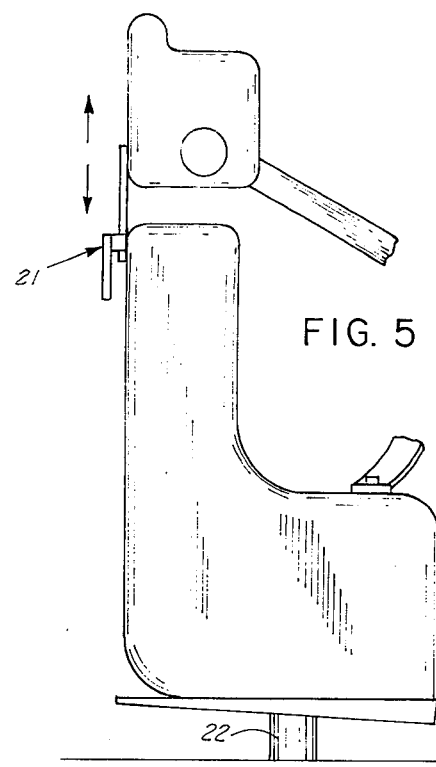
FIG. 5 is a side elevational view of the assembly of FIG. 1.

As illustrated in FIG. 1, seat 12 is positioned on the floor of the vehicle and may be held fixed in this position by conventional means (not shown). However, as illustrated in FIG. 5, the seat may be supported by the upper end of a vertically disposed part 22 rotatably mounted at its other end to the floor of the vehicle. In this manner, the seat can be swiveled for easy access thereto and easy exit therefrom.

Assembly 10 also includes a seat belt arrangement 24 comprising a first or waist securing seat belt 26 and a second or shoulder securing seat belt 28. As illustrated in FIG. 1, one end portion 30 of the seat belt 26 is fastened to a coupling member or seat belt positioning means 32 which is mounted for slidable movement in a slot 34 preferably provided in the top of inboard armrest 18. Hence, end portion 30 can be adjustably positioned towards and away from the backrest 16 of seat 12. In this regard, the coupling member 32 includes conventional means (not shown) for disengageably locking the member in a desired position within the slot and an actuating button 36 for disengaging the locking means.

Figure 2:
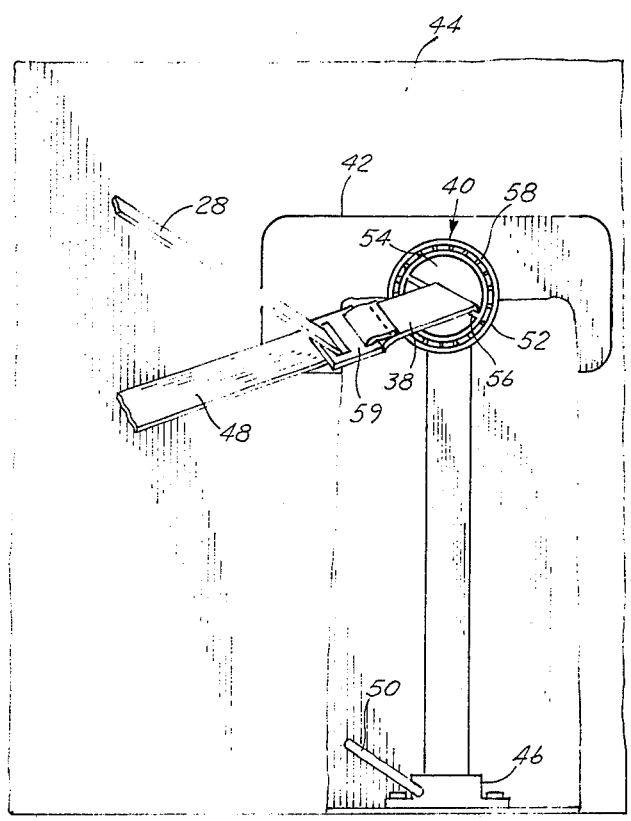
FIG. 2 is an enlarged, partially broken away view of a particular detail of the assembly of FIG. 1.

As illustrated best in FIG. 2, the other end portion 38 of belt 26 passes through an automatic belt contouring mechanism 40 mounted in a hollow outboard armrest 42 comprising part of the vehicle door 44. The end portion 38 passes between the outboard armrest and door where it is coupled to a movement control mechanism 46 bolt mounted on the bottom of the door. As shown in FIG. 1, the belt contouring mechanism 40 is positioned in horizontal alignment with the top of inboard armrest 18. Hence, the intermediate portion 48 of belt 26, when taut, extends in a horizontal plane passing through the waist of a person who might be seated in seat 12 and disposed generally adjacent the upper surfaces of the legs of such person.

Movement control mechanism 46 may be a conventional seat belt inertia reel or other similar spring biased device. Such a reel includes means for forcing a portion (end portion 38) of the seat belt around the reel for retracting the seat belt portion. The seat belt may be unwound from the reel by applying external pulling force to the belt. However, means are provided for preventing further unwinding movement upon a momentary acceleration of the belt or the vehicle. Hence, when the vehicle door 44 is opened, end potion 38 of the belt 26 is unwound from movement control mechanism 46, allowing a person to move into vehicle seat 12 and between the backrest 16 and intermediate seat belt portion 48. Upon closing the door, the seat belt is retracted so as to engage about the waist of the person seated within the car. Although the seat belt may not completely retract to its initial completely wound position, mechanism 46 prevents it from moving any further thereby securing the person in his seat. Mechanism 46 is provided with a disabling release 50. Upon opening the door 44 disabling release 50 permits the seat belt to unwind from mechanism 46 without regard to acceleration. Hence, the door may be opened as rapidly as desired.

As stated above, the belt 26 passes through an automatic belt contouring mechanism 40. As illustrated in FIG. 2, the mechanism includes an outer annular support track 52 mounted in the outboard armrest 42 and a concentrically located inner disc 54 having a slot 56 extending entirely therethrough. The slot, as illustrated, is of sufficient dimensions so as to allow the belt to pass therethrough. A plurality of ball bearings are disposed between the disc 54 and annular track 52 and support the disc for rotational movement in either the clockwise or counterclockwise direction as viewed in FIG. 2. Hence, the intermediate belt portion 48 of belt 26 will easily twist to contour to the waist of the person in seat 12.

As stated above, seat belt arrangement 24 includes shoulder securing seat belt 28. As illustrated in FIG. 1, this seat belt is connected at one end to the inboard side of headrest 20 and at the opposite end to the intermediate portion 48 of belt 26. In this regard, an adjusting buckle 59 connects the shoulder belt to portion 38. Accordingly, when a person opens vehicle door 44 and positions himself in seat 12, he is not only secured therein at the waist, but also across the shoulder.

Figure 3:
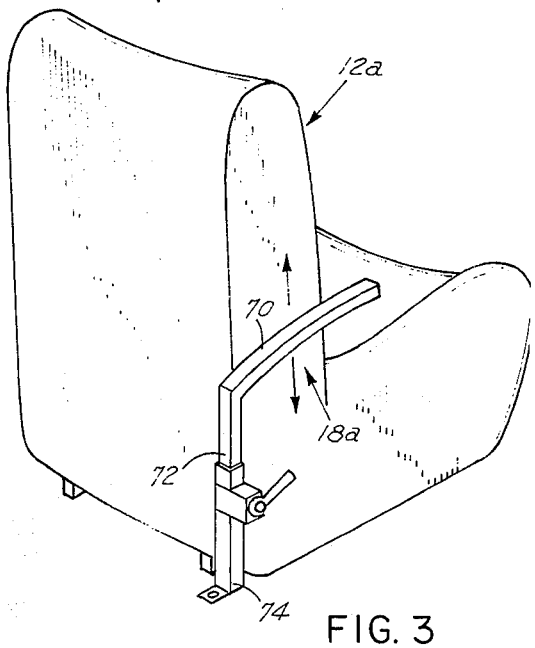
FIG. 3 is a perspective view of a modified embodiment of the assembly of FIG. 1.

Turning to FIG. 3, attention is directed to a modified seat 12a. Actually, the seat is similar to seat 12. Seat 12a includes an inboard armrest 18a. Armrest 18a includes a generally horizontally disposed portion 70 having one end connected with a generally vertically disposed portion 72 and having its otherwise free end, which extends in a forward direction beyond the seat's backrest, connected with the end portion 30 of seat belt 26 (not shown). The lower end of portion 72 fits telescopically within a hollow tube 74 mounted to and extending upwardly from the floor of the vehicle. Hence, the seat belt connecting portion 70 is vertically adjustable for adjusting the height of seat belt end portion 30.

Figure 4:
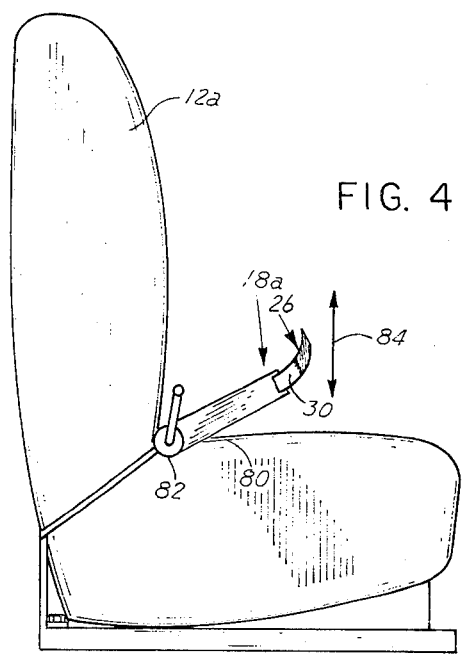
FIG. 4 is a side elevational view of a modified embodiment of the assembly of FIG. 3.

Seat 12a may also include an inboard armrest 18a, as illustrated in FIG. 4. Specifically, this armrest includes an elongated belt connecting member 80 which is connected at one end to a conventional ratchet arrangement 82 suitably secured to the seat. The belt connecting member extends forward from the backrest and is connected at its otherwise free end to end portion of seat belt 26. In this manner, member 80 can be adjustably moved by ratchet arrangement 82 for vertically adjusting end portion 30 of the seat belt, as indicated by arrow 84.

Figure 6:
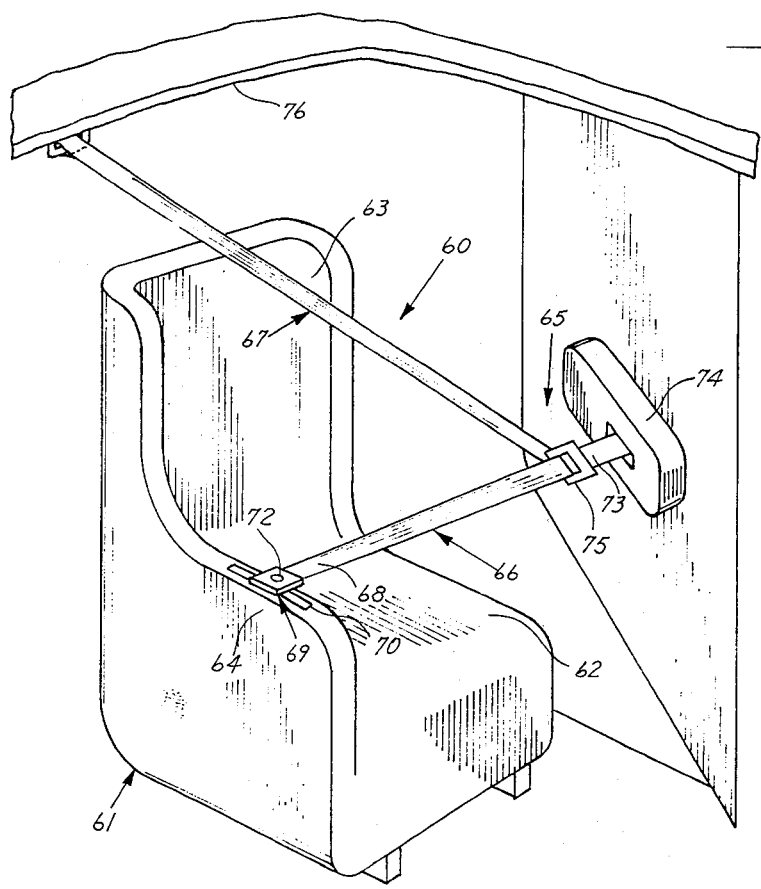
FIG. 6 is a perspective view of a further modified embodiment of the seat belt assembly of FIG. 1.

Attention is now directed to FIG. 6 which illustrates another embodiment 60 of a seat belt assembly constructed in accordance with the present invention. As shown, assembly 60 includes a vehicle seat 61, preferably of the cacoon type, having a generally horizontally disposed seat portion 62, a generally vertically disposed backrest portion 63 and an inboard armrest portion 64 disposed adjacent the seat portion 62 and extending upwardly therefrom.

Assembly 60 also includes a seat belt arrangement 65 comprising a first or waist securing seat belt 66 and a second or shoulder securing seat belt 67. As illustrated in FIG. 6, one end portion 68 of seat belt 66 is positioned to a coupling member 69 which is mounted for slidable movement in a slot on armrest 64 in the same manner described with respect to assembly 10 of FIG. 1. In this regard, locking means (not shown) and an actuating button 72 are provided with coupling member 69.

As illustrated in FIG. 6, the other end portion 73 of belt 66 is connected to a movement control mechanism mounted within armrest 74 which unlike mechanism 46, is mounted adjacent to an outboard armrest 74 mounted to the vehicle door and in general horizontal alignment with the top of inboard armrest 64. The mechanism is preferably swivally mounted to the vehicle door by conventional means not shown.

Seat belt 66 operates in the same manner as seat belt 26 for automatically securing a passenger into vehicle seat 61.

Shoulder securing seat belt 67 is connected at one end to seat belt 73 by an adjustable buckle 75. Its other end, rather than being connected to a head rest, is preferably suitably fastened to a seat belt securing means mounted on the ceiling 76 of the vehicle whereby a portion of seat belt 67 overlies the "inboard" shoulder of a person when seated in said seat. Like shoulder securing seat belt 28, seat belt 67 automatically adds to the securement of a person in the vehicle seat.

Figure 8:
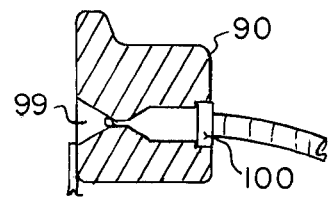
FIG. 8 is a view in partial cross-section of a means for mounting one end of the shoulder securing seat belt to a headrest.
Figure 7:
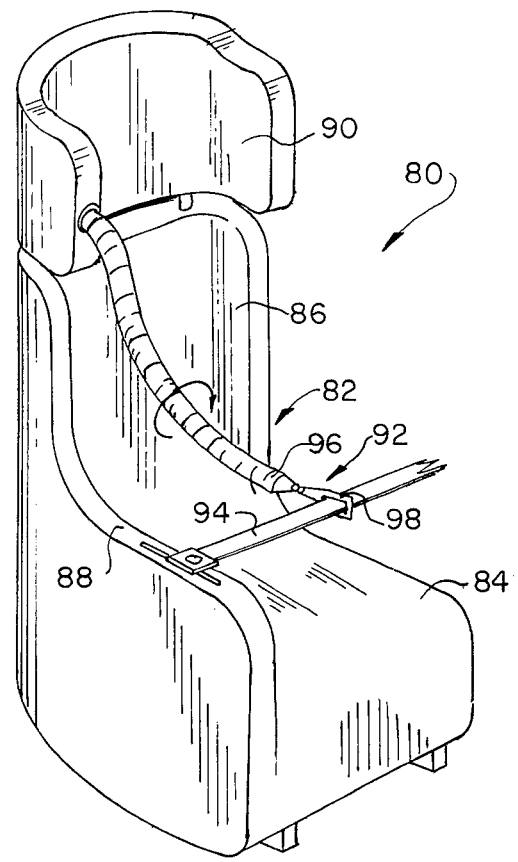
FIG. 7 is a partial perspective view of another embodiment of a seat belt assembly constructed in accordance with the present invention.

Turning now to FIGS. 7 and 8, there is illustrated still another embodiment of a seat belt assembly 80 constructed in accordance with the present invention. Assembly 80, like previously described seat belt assembly 12, includes a preferably cacoon-shaped vehicle seat 82 having a generally horizontally disposed seat portion 84, a back rest portion 86 and an inboard armrest portion 88. In addition, the seat preferably includes an adjustable headrest 90. However, in accordance with the present invention and as will be seen hereinafter, assembly 80 includes a novel shoulder belt arrangement which maximizes safety and convenience to the passenger while minimizing possible damage to the passenger's clothing or injury to the passenger's neck. Briefly, this is achieved by utilizing a shoulder belt which is generally circular in cross-section and which tends to roll across the passenger upon relative movement of the shoulder belt with respect to the passenger. Hence, in the event the passenger is thrown toward the front of the vehicle or to one side, there is, for example, no possibility of the belt cutting into the passenger's neck which is a definite possibility where the conventional flat seat belt is used. In addition, as the passenger enters or leaves the vehicle seat, there is substantially no possibility of the shoulder belt catching or binding upon the passenger's tie, pencils, pens and the like.

Turning specifically to FIG. 7, the seat belt arrangement, which is generally designated by the reference numeral 92, includes a waist securing seat belt 94 which may be similar to the aforedescribed seat belt 26 and which is suitably secured at one end to an inboard armrest 80. The other end of the seat belt 94, while not shown, is suitably secured, for example, to the vehicle door in a manner similar to that shown in either FIG. 1 or FIG. 6.

In accordance with the present invention, the seat belt arrangement 92 includes a shoulder securing seat belt 96 having a surface portion which is generally circular in cross-sectional configuration. The seat belt 96 is connected at its forward end to a suitable spinner attachment 98 which is sewn to a portion of the seat belt 94, as illustrated in FIG. 7, or may otherwise be suitably secured relative to the seat. The other end of the seat belt 96 is connected to the head rest 90. As shown in FIG. 8, the shoulder securing seat belt 96 extends to head rest 90 where it is attached to a second spinner or pivot attachment 99 which is internally secured in the head rest 90. Hence, it should be readily apparent that belt 96 is capable of spinning about its curvalinear axis. In this regard, it should be noted than an annular bearing 100 may be provided around the shoulder securing seat belt 96 at the point of entry into the headrest 90 thereby facilitating rolling action of the belt across the adjacent surface of a passenger when seated in said seat. Further, the belt 96 is preferably constructed such that it extends in an elongated configuration outwardly from the headrest 90 thereby forming a cantilevered relation with said headrest. In this manner, the seat belt 96 will tend to extend forwardly of the passenger, as shown in FIG. 8, to facilitate the passenger's entering into and exiting out of the vehicle.

Figure 9:
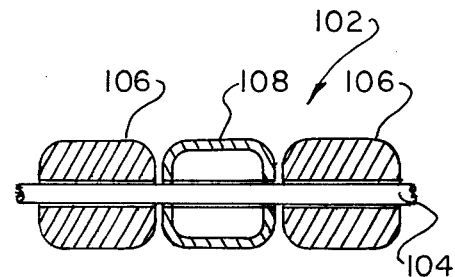
FIG. 9 is a sectional view taken along the longitudinal axis of one embodiment of a portion of a shoulder securing seat belt constructed in accordance with this invention.

A modified shoulder securing seat belt 102 constructed in accordance with this invention is shown in FIG. 9 comprising a flexible, axially extending part 104 and a plurality of surface portions 106 and 108 each having, in cross-section, a generally circular configuration and each being mounted for rotational movement relative to the part 104. The surface portions 106 are formed from a solid material except for an axially extending opening formed therethrough while surface portion 108 is formed from a hollow material which also has an axially extending opening formed therethrough.

Figure 10:
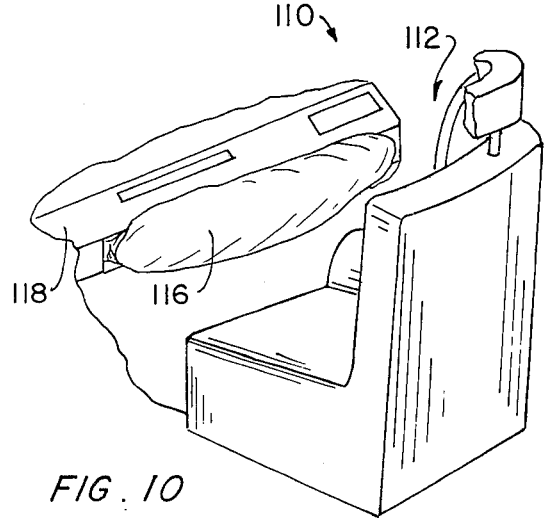
FIG. 10 is a partial perspective of another embodiment of another seat belt assembly constructed in accordance with this invention.
Figure 11:
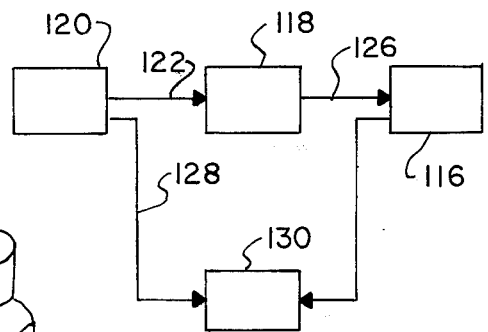
FIG. 11 is a block diagram illustrating the operation of the assembly shown in FIG. 10.

With assemblies 10 (FIG. 1), 60 (FIG. 6) and 80 (FIG. 7) constructed in the foregoing manner, attention is now directed to FIGS. 10 and 11 which illustrate a combination passenger safety arrangement 110 constructed in accordance with the present invention. The arrangement 110 includes a vehicle-mounted safety seat belt assembly 112 which may be identical to any of the assemblies illustrated and described hereinabove. Hence, a description of assembly 112 is not deemed necessary. In addition to seat belt assembly 112, the combination passenger safety arrangement 110 includes an inflatable bladder means or cushion means 114 (see FIG. 11) including an inflatable bladder 116 which is suitably mounted in the dash 118 of the vehicle in front of a passenger seat which comprises a part of assembly 112. As will be seen with respect to FIG. 11, assembly 114 includes means 118 for inflating the bladder in response to increases in speed of the vehicle. Hence, as the vehicle accelerates, the size of the bladder 116 will increase thereby creating a cushion of increased size in the event the passenger is thrown toward the front of the vehicle.

Turning now to FIG. 11, assembly 114 is described. As shown, the assembly includes means 120 for producing a signal 122 in response to and proportionate to increases in speed of the vehicle. Means 120 may be of any conventional type and signal 122 may be an electrical, mechanical or pneumatic signal. Signal 122 as applied to the input of a pressurized fluid supply 118 (preferably pressurized air) which supplies fluid under pressure at its output in response to the input signal 122, the fluid being generally designated by the reference numeral 126. More specifically, as the speed of the vehicle increases, the input signal 122 generated by means 120 causes supply 124 to produce a proportionate amount of pressurized fluid 126. As illustrated in FIG. 11, pressurized fluid 126 is applied to bladder 116 causing the bladder to inflate further in response to increases in speed of the vehicle. Upon deceleration or a reduction of speed of the vehicle, a second signal 128 is produced at the output by means 120, this latter signal being proportionate to the amount of deceleration. Signal 128 is applied to a suction or vacuum device 130 which, in turn, is connected with the bladder 116 for deflating the bladder in response to and proportionate to the magnitude of signal 128 and therefore the decrease in the speed of the vehicle.

From the foregoing, it should be apparent that the amount of inflation of bladder 116 will depend upon the speed at which the vehicle is traveling. The greater the speed of the vehicle, the more inflated will be the bladder thereby providing an increasing degree of protection to the passenger if thrown to the front of the vehicle.

From the foregoing, it should be apparent that the present invention provides an uncomplicated method of safely and automatically securing a person in the seat of a vehicle with no inconvenience to the person.

Many modifications and variations of the present invention are possible in light of the above teachings. It is therefore intended to be understood that within the scope of the appended claims the invention may be practiced otherwise than as specifically described. For example, the means intercoupling the seat belt to the vehicle door may be suitably mounted for vertical movement along said door thereby to provide an additional degree of vertical adjustment of said seat belt relative to the upper surfaces of a person's legs when said person is seated in the seat.

I claim:
1. A vehicle-mounted, passive seat belt assembly comprising:

a. a vehicle seat having
  1. a generally horizontally disposed seat portion,
  2. a backrest portion, and
  3. an inboard seat belt positioning means disposed adjacent one side of said seat portion forwardly of said backrest portion and having a part disposed above said seat portion, said part lying generally in a horizontal plane disposed approximately adjacent the upper surfaces of the legs of a person when seated in said vehicle seat, and
 b. a vehicle door disposed adjacent the other side of said seat portion;
 c. a first seat belt securing means intercoupled with said vehicle door and lying generally in a horizontal plane disposed immediately adjacent the upper surfaces of the legs of a person when seated in said vehicle seat;
 d. a second seat belt securing means disposed inboard of said vehicle seat;
 e. a seat belt having
  1. a first portion disposed in supporting engagement with said part of said inboard seat belt positioning means,
  2. a second portion intercoupled with said first seat belt securing means,
  3. a third portion extending between said first and second portions and being disposed uninterrupted in extent and spaced above said seat portion to overlie same continuously for any open and closed position of said vehicle door,
  4. a fourth portion disposed in supporting engagement with said second seat belt securing means whereby a part of said fourth portion is disposed adjacent the upper part of the backrest portion of said vehicle seat and in positioning of one shoulder of a person seated in said vehicle seat, and
  5. a fifth portion extending between said third portion and the part of said fourth portion and being disposed uninterrupted in extent and spaced generally forwardly of said backrest portion for any open or closed position of said vehicle door;
 f. said inboard seat belt positioning means, said first portion of said seat belt and said horizontally disposed seat portion cooperating to provide a generally rectangularly spacing sufficient to receive therein the legs of a person using the seat;
 g. means for retracting at least a part of said seat belt upon closing of said vehicle door thereby maintaining a predetermined tautness therealong; and
 h. means for preventing movement of said seat belt relative to at least one of said inboard seat positioning means and said first seat belt securing means in response to the application of a predetermined accelerative force applied to a vehicle in which said seat belt assembly is mounted.

2. A vehicle-mounted, passive seat belt assembly as described in claim 1 in which said last two mentioned means includes an inertia reel.

3. A vehicle-mounted, passive seat belt assembly as described in claim 1 in which said vehicle door includes an armrest portion formed thereon.

4. A vehicle-mounted, passive seat belt assembly as described in claim 1 wherein said vehicle seat is of the cacoon type and mounted for pivotal movement about a generally vertically disposed axis.

5. A vehicle-mounted, passive seat belt assembly as described in claim 1 in which said vehicle seat includes an inboard portion for preventing inward movement of the head of a person when seated in said vehicle seat.

6. A vehicle-mounted, passive seat belt assembly comprising:
   a. a vehicle seat having
      1. a generally horizontally disposed seat portion, 2. a backrest portion,
      3. means disposed adjacent one side of said seat portion forwardly of said backrest portion and having a part disposed above said seat portion, said part lying generally in a horizontal plane disposed approximately adjacent the upper surfaces of the legs of a person when seated in said vehicle seat, and
   b. a vehicle door disposed adjacent the other side of said seat portion;
   c. a first seat belt securing means intercoupled with said vehicle door and lying generally in a plane disposed approximately adjacent the upper surfaces of the legs of a person when seated in said vehicle seat;
   d. a second seat belt securing means disposed inboard of said vehicle seat;
   e. a seat belt having
      1. a first portion disposed in supporting engagement with said part of the means of said vehicle seat,
      2. a second portion intercoupled with said first seat belt securing means,
      3. a third portion extending between said first and second portions and being disposed uninterrupted in extent and spaced above said seat portion to overlie same continuously for any open and closed position of said vehicle door,
      4. a fourth portion disposed in supporting engagement with said second seat belt securing means whereby a part of said fourth portion is disposed adjacent the inboard shoulder of a person seated in said vehicle seat, and
      5. a fifth portion extending between said third portion and the part of said fourth portion and being disposed uninterrupted in extent and spacdd generally forwardly of said backrest portion for any open and closed position of said vehicle door;
   f. said means disposed adjacent one side of said seat portion, said first portion of said seat belt and said horizontally disposed seat portion cooperating to provide a generally rectangularly spacing sufficient to receive therein the legs of a person using the seat;
   g. means for retracting at least a part of said seat belt upon closing of said vehicle door thereby maintaining a predetermined tautness therealong; and
   h. means for preventing movement of said seat belt relative to at least one of said means disposed adjacent one side of said seat portion and said first seat belt securing means in response to the application of a predetermined accelerative force applied to a vehicle in which said seat belt assembly is mounted.

7. A vehicle-mounted, passive seat belt assembly as described in claim 6 in which said last two mentioned means includes an inertia reel.

8. A vehicle-mounted, passive seat belt assembly as described in claim 6 in which said first seat belt securing means is mounted for gimbal movement relative to said vehicle door.

9. A vehicle-mounted, passive seat belt assembly as described in claim 6 in which said vehicle door includes an armrest portion formed thereon.

10. A vehicle-mounted, passive seat belt assembly as described in claim 6, including releasably securing means whereby in one position thereof relative movement between the second portion of said set belt and said first seat belt securing means is precluded while in another position thereof relative movement may occur between the second portion of said seat belt and said first seat belt securing means.

11. A vehicle-mounted, passive seat belt assembly as described in claim 6 wherein said vehicle seat is of the cacoon type and mounted for pivotal movement about a generally vertically disposed axis.

12. A vehicle-mounted, passive seat belt assembly as described in claim 6 in which at least the third portion of said seat belt is coated with a plastic material.

13. A vehicle-mounted, passive seat belt assembly as described in claim 6 in which said first seat belt securing means is mounted for gimbal movement relative to said door.

14. A vehicle-mounted, passive seat belt assembly, comprising:
   a. a vehicle seat having
      1. a generally horizontally disposed seat portion,
      2. a backrest portion, and 3. means disposed adjacent one side of said seat portion forwardly of said backrest portion and having a part disposed above said seat portion, said part lying generally in a plane disposed approximately adjacent the upper surfaces of the legs of a person when seated in said vehicle seat;
   b. a vehicle door disposed adjacent the other side of said seat portion;
   c. a seat belt securing means intercoupled with said vehicle door and lying generally in a horizontal plane disposed approximately adjacent the upper surfaces of the legs of a person when seated in said vehicle seat;
   d. a seat belt having
      2. a first portion disposed in supporting engagement with said part of the means of said vehicle seat,
      2. a second portion intercoupled with said seat belt securing means, and
      3. a third portion extending between said first and second portions and being disposed uninterrupted in extent and spaced above said seat portion to overlie same continuously for any open and closed position of said vehicle door;
   e. said means disposed adjacent one side of said seat portion, said first portion of said seat belt and said horizontally disposed seat portion cooperating to provide a generally rectangularly spacing sufficient to receive therein the legs of a person using the seat;
   f. means for retracting at least a part of said seat belt upon closing of said vehicle door thereby maintaining a predetermined tautness therealong; and
   g. means for preventing movement of said seat belt relative to at least one of said means disposed adjacent one side of said seat portion and said seat belt securing means in response to the application of a predetermined accelerative force applied to the vehicle in which said seat belt assembly is mounted.

15. A vehicle-mounted, passive seat belt assembly as described in claim 14 including releasably securing means whereby in one position thereof relative movement between one of the portions of said seat belt and one of the seat belt securing means and vehicle seat means is precluded while in another position thereof relative movement therebetween may occur.

16. A vehicle-mounted, passive seat belt assembly as described in claim 14 in which said vehicle door includes an outboard armrest type portion, and said part of said vehicle seat means lies substantially in the same plane in which is disposed said seat belt securing means.

17. For use in combination with a vehicle having a seat including a seat portion and a backrest portion, and a door adjacent one side of said seat; a seat belt assembly comprising first belt attachment means adapted to be mounted on support means disposed adjacent the side of the vehicle seat remote from the door at a position which is forwardly of the backrest portion, second seat belt attachment means adapted to be mounted on the vehicle door at an elevation above the level of the seat portion of the vehicle seat, third belt attachment means adapted to be mounted adjacent the upper portion of the backrest portion at the side of the backrest remote from the door, a seat belt having one end coupled to said first attachment means and having its other end coupled to said third attachment means, coupling means on said second attachment means slidably coupling an intermediate portion of said belt to said second attachment means whereby said belt in extending between said first and second attachment means passes above the legs of a person seated in the vehicle seat and passes from said second attachment means diagonally across the chest of the seated person, said seat portion, said support means and said one end of said seat belt cooperating to provide a generally rectangularly spacing sufficient to receive therein the legs of a person using the seat; one of said attachment means including releasable latch means for selectively attaching said belt to said one of said attachment means, and extensible coupling means on at least one of said first and said second attachment means for accommodating opening and closing movement of the door while said belt is attached to all of said attachment means.

18. A vehicle-mounted, passive seat belt assembly comprising:
 a. a vehicle seat having
  1. a generally horizontally disposed seat portion,
  2. a backrest portion,
  3. means disposed adjacent one side of said seat portion and having a part disposed above said seat portion forwardly of said backrest portion, said part lying generally in a horizontal plane disposed approximately adjacent the upper surfaces of the legs of a person when seated in said vehicle seat, and
 b. a vehicle door disposed adjacent the other side of said seat portion;
 c. a first seat belt securing means intercoupled with said vehicle door so as to be mounted for gimbal movement relative thereto and lying generally in a plane disposed approximately adjacent the upper surfaces of the legs of a person when seated in said vehicle seat;
 d. a second seat belt securing means disposed inboard of said vehicle seat;
 e. a seat belt having
  1. a first portion disposed in supporting engagement with said part of the means of said vehicle seat,
  2. a second portion intercoupled with said first seat belt securing means,
  3. a third portion extending between said first and second portions and being disposed uninterrupted in extent and spaced above said seat portion to overlie same continuously for any open and closed position of said vehicle door,
  4. a fourth portion disposed in supporting engagement with said second seat belt securing means whereby a part of said fourth portion is disposed adjacent the inboard shoulder of a person seated in said vehicle seat, and
  5. a fifth portion extending between said third portion and the part of said fourth portion and being disposed uninterrupted in extent and spaced generally forwardly of said backrest portion for any open and closed position of said vehicle door;
 f. said horizontally disposed seat portion, said means disposed adjacent one side of said seat portion and said first portion of said seat belt cooperating to provide a generally rectangularly spacing sufficient to receive therein the legs of a person using the seat;
 g. means for retracting at least a part of said seat belt upon closing of said vehicle door thereby maintaining a predetermined tatuness therealong; and
 h. means for preventing movement of said seat belt relative to at least one of said means disposed adjacent one side of said portion and said first seat belt securing means in response to the application of a predetermined accelerative force applied to a vehicle in which said seat belt assembly is mounted.

* * * * *